(12) United States Patent
Yoo et al.

(10) Patent No.: US 11,103,905 B2
(45) Date of Patent: Aug. 31, 2021

(54) ELECTRODE ROLLING APPARATUS HAVING HEATING UNIT FOR HEATING NON-COATED PORTION AND ELECTRODE MANUFACTURING SYSTEM COMPRISING THE SAME

(71) Applicant: LG Chem, Ltd., Seoul (KR)

(72) Inventors: Su-Yeon Yoo, Daejeon (KR); Hye-Jin Song, Daejeon (KR); In-Ae Yun, Daejeon (KR); Jeong-Woo Lee, Daejeon (KR); Kyu-Sung Jung, Daejeon (KR); Hyo-Seung Jung, Daejeon (KR); Min-Ji Heo, Daejeon (KR)

(73) Assignee: LG Chem, Ltd.

( * ) Notice: Subject to any disclaimer, the term of this patent is extended or adjusted under 35 U.S.C. 154(b) by 68 days.

(21) Appl. No.: 16/579,034

(22) Filed: Sep. 23, 2019

(65) Prior Publication Data
US 2020/0156128 A1   May 21, 2020

(30) Foreign Application Priority Data

Nov. 20, 2018   (KR) .................. 10-2018-0143786

(51) Int. Cl.
*B21B 27/06*   (2006.01)
*H05B 3/00*   (2006.01)
(Continued)

(52) U.S. Cl.
CPC ......... *B21B 27/06* (2013.01); *H01M 10/0585* (2013.01); *H05B 3/0095* (2013.01); *B21B 2027/086* (2013.01)

(58) Field of Classification Search
None
See application file for complete search history.

(56) References Cited

U.S. PATENT DOCUMENTS

| 2010/0264133 A1 | 10/2010 | Jeong et al. |
| 2011/0039138 A1 | 2/2011 | Jeong et al. |

FOREIGN PATENT DOCUMENTS

| JP | H09180735 A | 7/1997 |
| JP | 2016021283 A | 2/2016 |

(Continued)

OTHER PUBLICATIONS

English translation of Watanabe WO2016059693 obtained via Google Patents Jan. 20, 2020 (Year: 2020).*

*Primary Examiner* — Sarah A. Slifka
(74) *Attorney, Agent, or Firm* — Lerner, David, Littenberg, Krumholz & Mentlik, LLP

(57) ABSTRACT

An electrode rolling apparatus according to an embodiment of the present disclosure includes a sensing unit positioned above an electrode for a secondary battery being transferred along a lengthwise direction to measure a distance to the electrode for each location along a widthwise direction of the electrode, a control unit which identifies a location of a non-coated portion formed on the electrode using information associated with the distance between the sensing unit and the electrode measured through the sensing unit, and outputs a control signal to heat a region in which the identified non-coated portion is formed, a heating unit positioned above the electrode to selectively heat only the region in which the non-coated portion is formed according to the control signal of the control unit, and a rolling unit which rolls the electrode having the selectively heated region in which the non-coated portion is formed.

11 Claims, 8 Drawing Sheets

(51) Int. Cl.
   *H01M 10/0585* (2010.01)
   *B21B 27/08* (2006.01)

(56) References Cited

FOREIGN PATENT DOCUMENTS

| | | | | | |
|---|---|---|---|---|---|
| KR | 20060034127 | A | * | 4/2006 | ............. H01M 4/04 |
| KR | 20100116027 | A | | 10/2010 | |
| KR | 20110017761 | A | | 2/2011 | |
| KR | 20120126303 | A | * | 11/2012 | .......... H01M 4/0404 |
| KR | 20160047693 | A | * | 5/2016 | ............. H01M 4/04 |
| KR | 20160141448 | A | * | 12/2016 | ............. H01M 4/04 |
| KR | 20160141448 | A | | 12/2016 | |
| KR | 20170092062 | A | * | 8/2017 | ............. H01M 4/04 |
| KR | 20170092062 | A | | 8/2017 | |
| WO | WO-2016059693 | A1 | * | 4/2016 | ............. H01M 2/16 |

* cited by examiner

ELECTRODE ROLLING APPARATUS HAVING HEATING UNIT FOR HEATING NON-COATED PORTION AND ELECTRODE MANUFACTURING SYSTEM COMPRISING THE SAME

TECHNICAL FIELD

The present disclosure relates to an electrode rolling apparatus having a heating unit for heating a non-coated portion and an electrode manufacturing system comprising the same, and more particularly, to an electrode rolling apparatus including a sensing unit to identify the location of a non-coated portion of an electrode and a heating unit to heat the non-coated portion and configured to selectively heat only the non-coated portion region to eliminate or minimize an elongation difference between the non-coated portion region and a coated portion region during rolling, thereby improving the quality of the electrode and an electrode manufacturing system comprising the same.

The present application claims the benefit of Korean Patent Application No. 10-2018-0143786 filed on Nov. 20, 2018 with the Korean Intellectual Property Office, the disclosure of which is incorporated herein by reference in its entirety.

BACKGROUND ART

In manufacturing an electrode of a secondary battery, coating and drying processes of an electrode active material are followed by a rolling process of the electrode, and in the current electrode rolling process, a bending phenomenon occurs in which the electrode bends due to an elongation difference between a coated portion coated with the electrode active material and a non-coated portion not coated with the electrode active material.

That is, in the electrode, the coated portion, namely, a region coated with the electrode active material, is subjected to higher pressure by a rolling roll due to its thickness and its elongation is higher, whereas the non-coated portion, namely, a region not coated with the electrode active material, is subjected to lower pressure than the coated portion and its elongation is lower.

Different elongations are manifested at each location of the electrode, and the coated portion and the non-coated portion are subjected to different magnitudes of forces, causing the electrode to be bent in part or in whole.

When the electrode bends, a performance difference may occur at each location of the electrode, and the life of a secondary battery manufactured using the electrode may be adversely affected.

Accordingly, there is a need for an approach to ensure uniform elongation over the entire electrode in the rolling process of the electrode.

DISCLOSURE

Technical Problem

The present disclosure is designed to solve the above-described problem, and therefore the present disclosure is aimed at preventing an electrode from being bent due to an elongation difference between a coated portion and a non-coated portion of the electrode in a rolling process.

The technical problem to be solved by the present disclosure is not limited to the above-described problem, and these and other problems will be clearly understood by those skilled in the art from the following detailed description.

Technical Solution

To solve the above-described problem, an electrode rolling apparatus according to an embodiment of the present disclosure includes a sensing unit positioned above an electrode for a secondary battery being transferred along a lengthwise direction to measure a distance to the electrode for each location along a widthwise direction of the electrode, a control unit which identifies a location of a non-coated portion formed on the electrode using information associated with the distance between the sensing unit and the electrode measured through the sensing unit, and outputs a control signal to heat a region in which the identified non-coated portion is formed, a heating unit positioned above the electrode to selectively heat only the region in which the non-coated portion is formed according to the control signal of the control unit, and a rolling unit which rolls the electrode having the selectively heated region in which the non-coated portion is formed.

The sensing unit may include a plurality of fixed sensors which measures distances to the electrode and is arranged along the widthwise direction of the electrode.

The control unit may compare the distances measured through the plurality of fixed sensors, and determine a region corresponding to the fixed sensor in which a larger value is measured as the non-coated portion.

The heating unit may include a plurality of fixed heaters which operates independently of one another and is arranged along the widthwise direction of the electrode.

The sensing unit may include a sensor guide rail which extends across the widthwise direction of the electrode, and a moveable sensor which measures the distance to the electrode for each location while moving along the sensor guide rail.

The control unit may compare the distances measured by the moveable sensor, and determine a region corresponding to a location of the moveable sensor at which a larger value is measured as the non-coated portion.

The heating unit may include a heater guide rail which extends across the widthwise direction of the electrode, and a moveable heater which heats the non-coated portion region while moving along the heater guide rail.

Only one moveable heater may be provided.

A plurality of moveable heaters may be provided, and the number of moveable heaters may at least correspond to the number of non-coated portion regions formed.

The rolling unit may include a pair of rolling rolls which contact each of an upper surface and a lower surface of the electrode.

Meanwhile, to solve the above-described problem, an electrode manufacturing system according to an embodiment of the present disclosure includes an unwinding roll which unwinds a wound electrode current collector, a winding roll which winds and collects the unwound electrode current collector, a coating apparatus which coats an electrode active material on the unwound electrode current collector, a drying apparatus which dries the coated electrode active material, and the electrode rolling apparatus according to an embodiment of the present disclosure which rolls an electrode having the dried electrode active material.

Advantageous Effects

According to an aspect of the present disclosure, in rolling the electrode of the secondary battery, it is possible to prevent the elongation of a coated portion and a non-coated portion from changing due to a difference in pressure applied to the coated portion and the non-coated portion, thereby improving the performance, life and quality of the secondary battery.

According to another aspect of the present disclosure, it is possible to produce different types of electrodes having various coated portion widths with good quality at once, thereby improving the productivity of the secondary battery.

That is, in forming coated portions with a non-coated portion interposed therebetween along the widthwise direction of an electrode current collector transferred by the roll to roll method, it is possible to variously form the width and number of non-coated portions and/or coated portions as needed. Accordingly, it is possible to produce electrodes of various sizes at once, and improve the quality of a secondary battery manufactured using the same.

BRIEF DESCRIPTION OF DRAWINGS

The accompanying drawings illustrate a preferred embodiment of the present disclosure, and together with the following detailed description of the present disclosure, serve to provide a further understanding of the technical aspects of the present disclosure described below, and thus the present disclosure should not be construed as limited to the drawings.

MODE FOR DISCLOSURE

Figure 1:
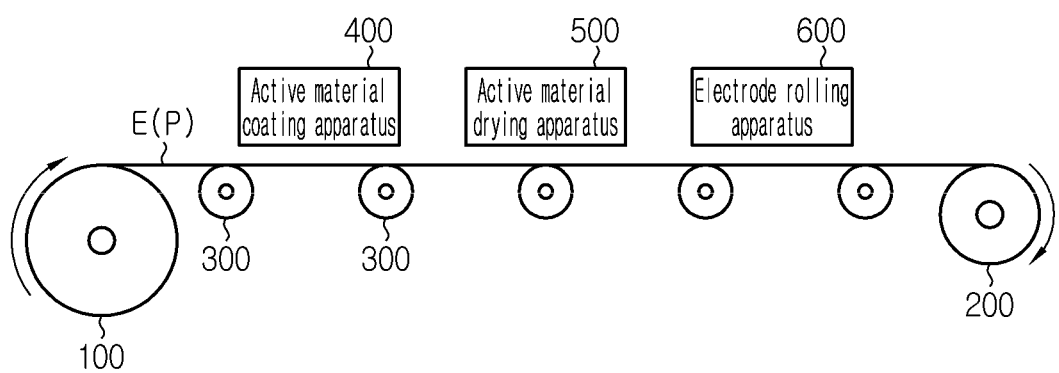
FIG. 1 is a conceptual diagram showing an electrode manufacturing system according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

First, referring to FIG. 1, an electrode manufacturing system according to an embodiment of the present disclosure is described.

FIG. 1 is a conceptual diagram showing the electrode manufacturing system according to an embodiment of the present disclosure.

Referring to FIG. 1, the electrode manufacturing system according to an embodiment of the present disclosure is implemented including an unwinding roll 100, a winding roll 200, a transfer roll 300, an active material coating apparatus 400, an active material drying apparatus 500 and an electrode rolling apparatus 600.

The unwinding roll 100 unwinds a wound electrode current collector P and supplies the electrode current collector P along the lengthwise direction of the electrode current collector P.

The winding roll 200 winds and collects an electrode E for a secondary battery completed as a final product by coating an electrode active material on the electrode current collector P supplied by the unwinding roll 100 and performing drying and rolling processes.

A plurality of transfer rolls 300 is provided below the electrode current collector P and the electrode E being transferred to support the electrode current collector P and the electrode E, and transfers the electrode current collector P and the electrode E in one direction through rotation.

The active material coating apparatus 400 coats an electrode active material on one surface or two surfaces of the electrode current collector P supplied by the unwinding roll 100.

The active material drying apparatus 500 dries the electrode active material coated on the electrode current collector P. That is, the active material coating apparatus 400 coats an electrode active material slurry containing solvent on the electrode current collector P, and the active material drying apparatus 500 removes the solvent contained in the coated electrode active material slurry to keep the electrode active material properly dry.

The electrode rolling apparatus 600 is an apparatus that rolls the electrode E for a secondary battery having the coated and dried electrode active material, and is configured to prevent the electrode E from being twisted due to an elongation difference between a region (coated portion) coated with the electrode active material and a region (non-coated portion) not coated with the electrode active material.

That is, the electrode rolling apparatus 600 according to the present disclosure is configured to, in rolling the electrode E, selectively heat only the non-coated portion region before performing the rolling process, to eliminate or minimize an elongation difference between the coated portion and the non-coated portion.

Hereinafter, the details of the electrode rolling apparatus 600 according to the present disclosure will be described in detail with reference to FIGS. 2 to 8.

Subsequently, referring to FIGS. 2 to 5, the electrode rolling apparatus 600 according to an embodiment of the present disclosure is described.

Figure 2:
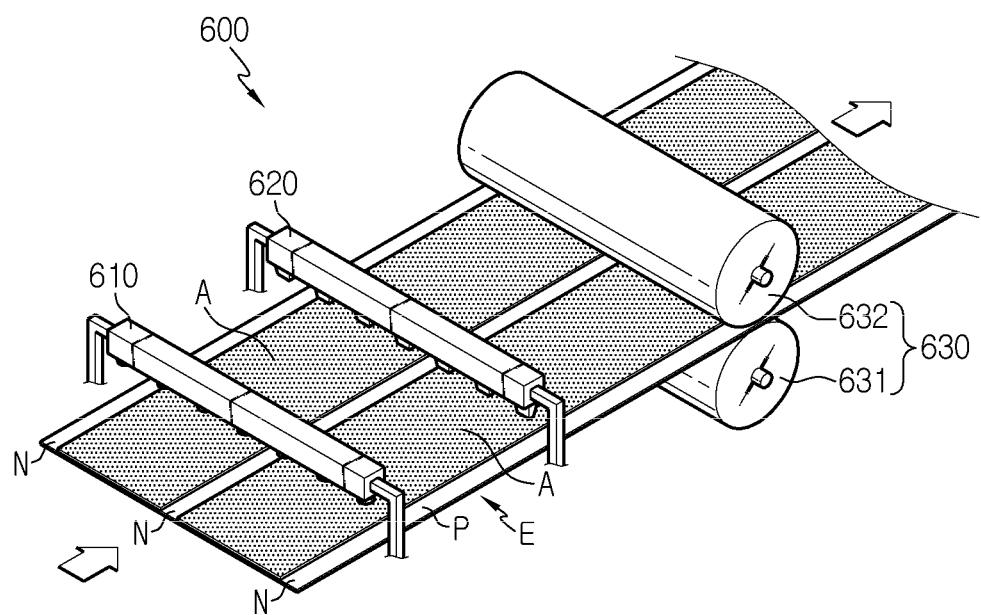
FIG. 2 is a conceptual diagram showing an electrode rolling apparatus according to an embodiment of the present disclosure.
Figure 3:
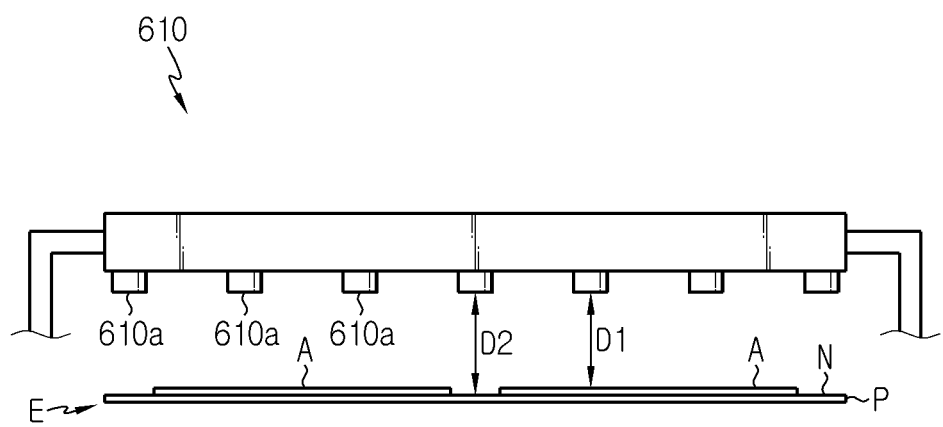
FIG. 3 is a front view showing a sensing unit applied to the electrode rolling apparatus according to an embodiment of the present disclosure shown in FIG. 2.
Figure 4:
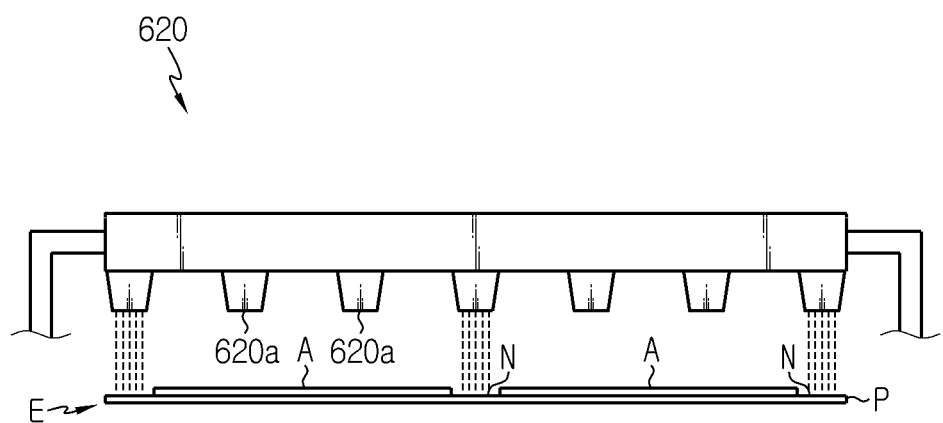
FIG. 4 is a front view showing a heating unit applied to the electrode rolling apparatus according to an embodiment of the present disclosure shown in FIG. 2.
Figure 5:
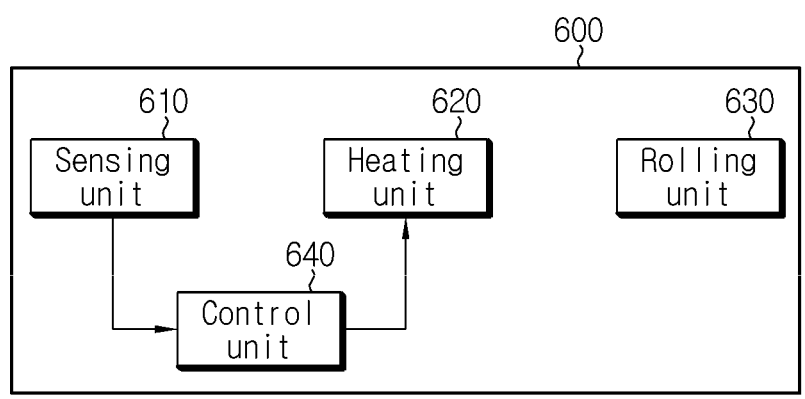
FIG. 5 is a block diagram showing the rolling apparatus shown in FIG. 2.

FIG. 2 is a conceptual diagram showing the electrode rolling apparatus according to an embodiment of the present disclosure. Additionally, FIG. 3 is a front view showing a sensing unit applied to the electrode rolling apparatus according to an embodiment of the present disclosure shown in FIG. 2, and FIG. 4 is a front view showing a heating unit applied to the electrode rolling apparatus according to an embodiment of the present disclosure shown in FIG. 2. Additionally, FIG. 5 is a block diagram showing the rolling apparatus shown in FIG. 2.

Referring to FIGS. 2 to 5, the electrode rolling apparatus 600 according to an embodiment of the present disclosure is implemented including a sensing unit 610, a heating unit 620, a rolling unit 630 and a control unit 640. The sensing unit 610, the heating unit 620 and the rolling unit 630 are arranged in that order along a transfer direction of the electrode current collector P and the electrode E.

The sensing unit 610 is positioned above the electrode E for a secondary battery transferred along the lengthwise direction and measures the distance to the electrode E for each location along the widthwise direction of the electrode E. As shown in FIG. 3, to measure the distance to the electrode E, the sensing unit 610 includes a plurality of fixed sensors 610a provided along the widthwise direction of the electrode E.

The plurality of fixed sensors 610a measures the distances D1, D2 between the upper surface of the electrode E and the fixed sensor 610a at each fixed location. Information associated with the distances measured by the plurality of fixed sensors 610a is transmitted to the control unit 640, and the control unit 640 may acquire location information of the non-coated portion N at which the electrode active material A is not formed on the upper surface of the electrode current collector P using the received information associated with the distances.

In detail, the plurality of fixed sensors 610a measures the distance D1 between the fixed sensor 610a and the upper surface of the electrode active material A or the distance D2 between the fixed sensor 610a and the non-coated portion N according to the installation location. The distance between the fixed sensor 610a and the non-coated portion N corresponds to the distance between the upper surface of the electrode current collector P and the fixed sensor 610a.

The control unit 640 compares the distances D1, D2 measured through the plurality of fixed sensors 610a, determines a region corresponding to the installation location of the fixed sensor 610a at which a larger value D2 is measured as the non-coated portion N, and outputs a control signal for heating the corresponding region.

The heating unit 620 is positioned above the electrode E to heat part of the upper surface of the electrode E, and in this instance, the heating unit 620 selectively heats only a region in which the non-coated portion N is formed according to the control signal of the control unit 640.

As described above, in the rolling process of the electrode E by the rolling unit 630, the coated portion region having a larger thickness in the presence of the electrode active material A elongate more, whereas the non-coated portion N region having a smaller thickness in the absence of the electrode active material A elongates less, and thus the electrode E bends in part or in whole.

To prevent the bending of the electrode E, before the rolling process is performed, the heating unit 620 selectively heats only the non-coated portion N to increase the elongation of the non-coated portion N, in order to achieve balance of elongation between the coated portion and the non-coated portion N after the rolling process is performed. To perform this function, the heating unit 620 includes a plurality of fixed heaters 620a that operates independently of one another, and is arranged along the widthwise direction of the electrode E. Among the plurality of fixed heaters 620a, only the fixed heater 620a installed at the location corresponding to the non-coated portion N operates according to the control signal of the control unit 640 to heat the non-coated portion N. The fixed heater 620a may be, for example, an induction heating device that heats by the induction heating method.

The rolling unit 630 may be implemented including a pair of rolling rolls 631, 632 that contact the lower surface and the upper surface of the electrode E respectively. The rolling unit 630 rotates the electrode E with the selectively heated non-coated portion N interposed between the pair of rolling rolls 631, 632, for uniform elongation of the entire electrode E.

The control unit 640 receives, as described above, the information associated with the distance between the sensing unit 610 and the electrode E from the sensing unit 610, identifies the location of the non-coated portion N through the information, and outputs the control signal for selectively operating only the heater 620a installed at the location corresponding to the region in which the non-coated portion N is disposed. That is, the sensing unit 610 and the heating unit 620 are in communication with each other through the control unit 640.

Subsequently, referring to FIG. 6 together with FIG. 5, a variation of the sensing unit having a different shape from those of FIGS. 2 and 3 will be described.

Figure 6:
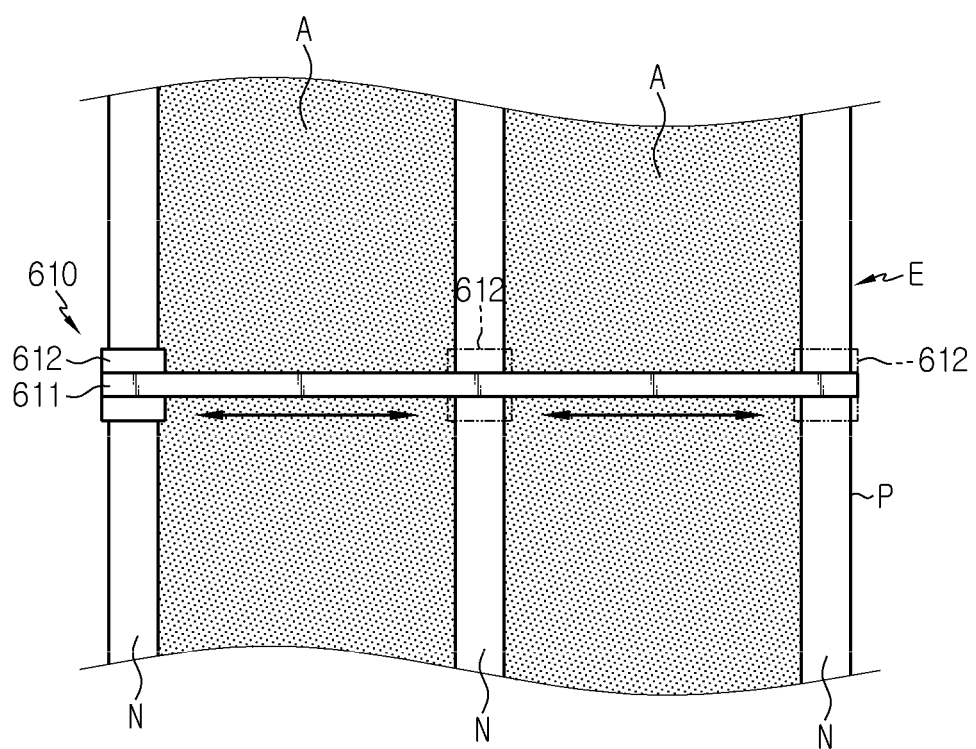
FIG. 6 is a diagram showing a variation of the sensing unit shown in FIGS. 2 and 3.

FIG. 6 is a diagram showing the variation of the sensing unit shown in FIGS. 2 and 3.

Referring to FIG. 6 together with FIG. 5, the sensing unit 610 applied to the present disclosure may be implemented including a sensor guide rail 611 and one moveable sensor 612.

The sensor guide rail 611 extends across the widthwise direction of the electrode E. The moveable sensor 612 measures the distance to the electrode E for each location while moving along the sensor guide rail 611. That is, as opposed to the previous embodiment using the plurality of fixed sensors 610a, this embodiment uses one mobile sensor 612 that can change its location to measure the distances from many places to the electrode E.

The movement of the moveable sensor 612 is guided by the sensor guide rail 611, and the moveable sensor 612 measures the distances D1, D2 between the moveable sensor 612 and the electrode E while moving along the widthwise direction of the electrode E, and transmits information associated with the measured distances D1, D2 for each location to the control unit 640.

The control unit 640 determines a location at which a larger value is measured by comparing the received information associated with the distances D1, D2 for each location, and determines a region corresponding to the location of the moveable sensor 612 at which the larger value is measured as the non-coated portion N.

Additionally, when the location of the non-coated portion N is determined, the control unit 640 outputs the control signal to control the heating unit 620 to selectively heat only the region corresponding to the non-coated portion N.

Subsequently, referring to FIG. 7 together with FIG. 5, a variation of the heating unit having a different shape from those of FIGS. 2 and 4 will be described.

Figure 7:
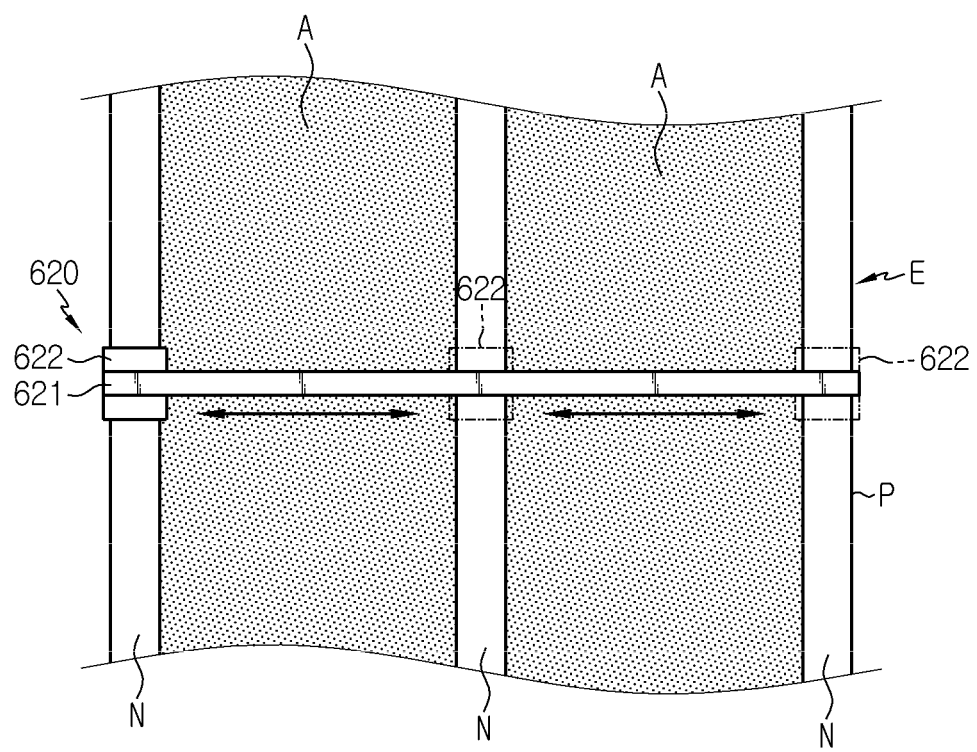
FIG. 7 is a diagram showing a variation of the heating unit shown in FIGS. 2 and 4.

FIG. 7 is a diagram showing the variation of the heating unit shown in FIGS. 2 and 4.

Referring to FIG. 7 together with FIG. 5, the heating unit 620 applied to the present disclosure may be implemented including a heater guide rail 621 and one moveable heater 622.

In the same way as the sensor guide rail 611 described previously, the heater guide rail 621 extends across the widthwise direction of the electrode E. The moveable heater 622 selectively heats only the non-coated portion N region while moving the heater guide rail 621. That is, as opposed to the previous embodiment using the plurality of fixed heaters 620a, this embodiment uses one moveable heater 622 that can change its location to move to a location facing the non-coated portion N and perform the heating process.

The movement of the moveable heater 622 is guided by the heater guide rail 621, and the moveable heater 622 selectively heats only the non-coated portion N region while moving along the widthwise direction of the electrode E according to the outputted control signal of the control unit 640 based on the information received from the sensing unit 610.

Subsequently, referring to FIG. 8 together with FIG. 5, a variation of the heating unit having a different shape from that of FIG. 7 will be described.

Figure 8:
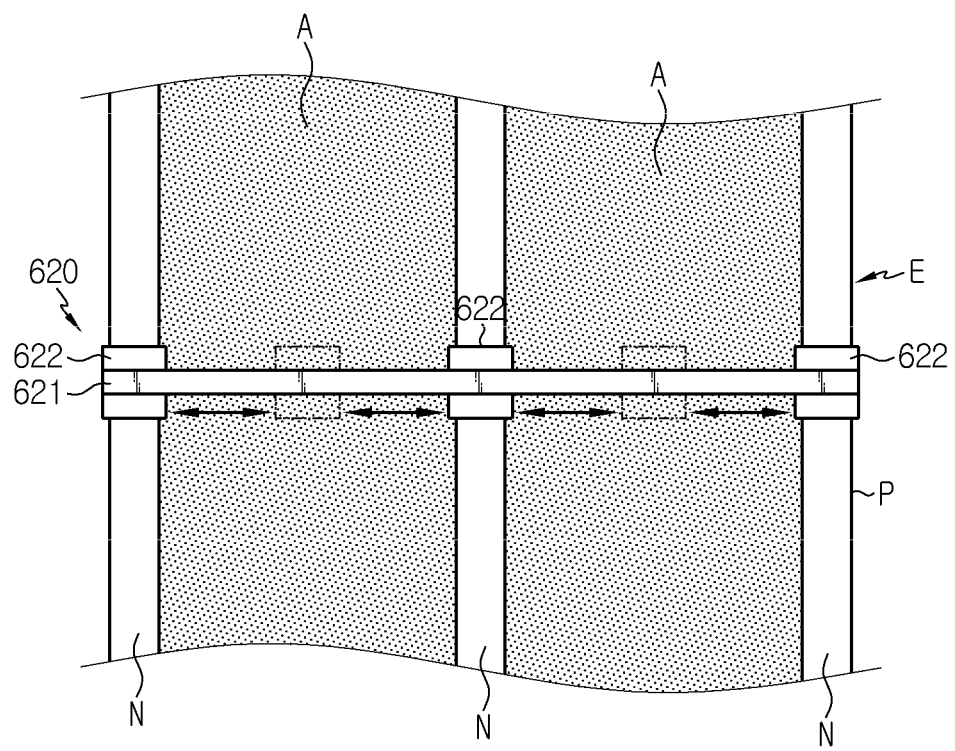
FIG. 8 is a diagram showing a variation of the heating unit shown in FIG. 7.

FIG. 8 is a diagram showing the variation of the heating unit shown in FIG. 7.

Referring to FIG. 8 together with FIG. 5, the heating unit 620a applied to the present disclosure may be implemented including a heater guide rail 621 and a plurality of moveable heaters 622.

The movement of the plurality of moveable heater 622 is guided by the heater guide rail 621, and the plurality of moveable heater 622 moves to a location facing the non-coated portion N closest to the current location while moving along the widthwise direction of the electrode E according to the outputted control signal of the control unit 640 based on the information received from the sensing unit 610, and heats a plurality of non-coated portion N regions at the same time.

The number of moveable heaters 622 at least corresponding to the number of non-coated portion N regions formed may be provided. Additionally, among the plurality of moveable heaters 622, the moveable heaters 622 moved above the non-coated portion N region may be controlled to start heating at the same temperature at the same time and finish heating at the same time.

As described above, with the plurality of moveable heaters 622, when each non-coated portion N region is heated at the same time and heating is finished at the same time, the heating time is the same for the plurality of non-coated portion N regions, thereby balancing the amount of heat over the non-coated portions N. When each non-coated portion N is heated at the same temperature, in the elongation by rolling, a deviation does not occur, and as a result, the electrode E does not twist, which brings about improvement in quality of the manufactured electrode E.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. An electrode rolling apparatus comprising:
a sensing unit positioned above an electrode for a secondary battery that is configured to be transferred along a lengthwise direction, to measure a distance between the sensing unit and the electrode for each location along a widthwise direction of the electrode;
a control unit configured to identify a location of a non-coated portion formed on the electrode using information associated with the distance between the sensing unit and the electrode measured through the sensing unit, and configured to output a control signal to heat a region in which the identified non-coated portion is formed based on the information received through the sensing unit;
a heating unit positioned above the electrode to selectively heat only the region in which the non-coated portion is formed according to the control signal of the control unit; and
a rolling unit configured to roll the electrode having the selectively heated region in which the non-coated portion is formed.

2. The electrode rolling apparatus according to claim 1, wherein the sensing unit includes a plurality of fixed sensors which are configured to measure the distance between the sensing unit and the electrode and which are arranged along the widthwise direction of the electrode.

3. The electrode rolling apparatus according to claim 2, wherein the control unit is configured to compare the distance measured through the plurality of fixed sensors, and is configured to determine a region corresponding to a fixed sensor in which a larger value is measured as the non-coated portion.

4. The electrode rolling apparatus according to claim 1, wherein the heating unit includes a plurality of fixed heaters which are configured to operate independently of one another and which are arranged along the widthwise direction of the electrode.

5. The electrode rolling apparatus according to claim 1, wherein the sensing unit includes:
a sensor guide rail which extends across the widthwise direction of the electrode; and
a moveable sensor configured to measure the distance between the sensing unit and the electrode for each location while moving along the sensor guide rail.

6. The electrode rolling apparatus according to claim 5, wherein the control unit is configured to compare the distances measured by the moveable sensor, and to determine a region corresponding to a location of the moveable sensor at which a larger value is measured as the non-coated portion.

7. The electrode rolling apparatus according to claim 1, wherein the heating unit includes:
a heater guide rail which extends across the widthwise direction of the electrode; and
a moveable heater configured to heat the non-coated portion region while moving along the heater guide rail.

8. The electrode rolling apparatus according to claim 7, wherein only one moveable heater is provided.

9. The electrode rolling apparatus according to claim 7, wherein a plurality of moveable heaters is provided, and a number of moveable heaters at least corresponds to a number of non-coated portion regions.

10. The electrode rolling apparatus according to claim 1, wherein the rolling unit includes a pair of rolling rolls which contact each of an upper surface and a lower surface of the electrode.

11. An electrode manufacturing system comprising:
an unwinding roll configured to unwind a wound electrode current collector;
a winding roll configured to wind and collect the unwound electrode current collector;
a coating apparatus configured to coat an electrode active material on the unwound electrode current collector;
a drying apparatus configured to dry the coated electrode active material; and the electrode rolling apparatus according to claim 1, configured to roll an electrode having the dried electrode active material.

* * * * *